F. P. CLARK.
FOCUSING FINDER ATTACHMENT FOR CAMERAS.
APPLICATION FILED JUNE 3, 1918.

1,301,819.

Patented Apr. 29, 1919.
2 SHEETS—SHEET 2.

Inventor
Fred P. Clark.
By Henry L. Reynolds
Attorney

UNITED STATES PATENT OFFICE.

FRED P. CLARK, OF SEATTLE, WASHINGTON, ASSIGNOR OF ONE-HALF TO JEROME P. COFFIN, OF SEATTLE, WASHINGTON.

FOCUSING-FINDER ATTACHMENT FOR CAMERAS.

1,301,819.  Specification of Letters Patent.  Patented Apr. 29, 1919.

Application filed June 3, 1918. Serial No. 237,912.

*To all whom it may concern:*

Be it known that I, FRED P. CLARK, a citizen of the United States, and resident of the city of Seattle, county of King, and State of Washington, have invented certain new and useful Improvements in Focusing-Finder Attachments for Cameras, of which the following is a specification.

My invention relates to a device for use as a focusing finder for cameras, and particularly for cameras of the folding type.

The object of my invention is chiefly to provide a focusing finder which may be attached to cameras already made. In other words, which may be used as an attachment to apply to any camera of the folding type, although of course, the principles of my invention may be incorporated in a camera when constructed and in such manner that the attachment will be covered in at one side when the camera is folded.

In the accompanying drawings I have shown my invention constructed as an attachment for application to cameras already made.

Figure 1:
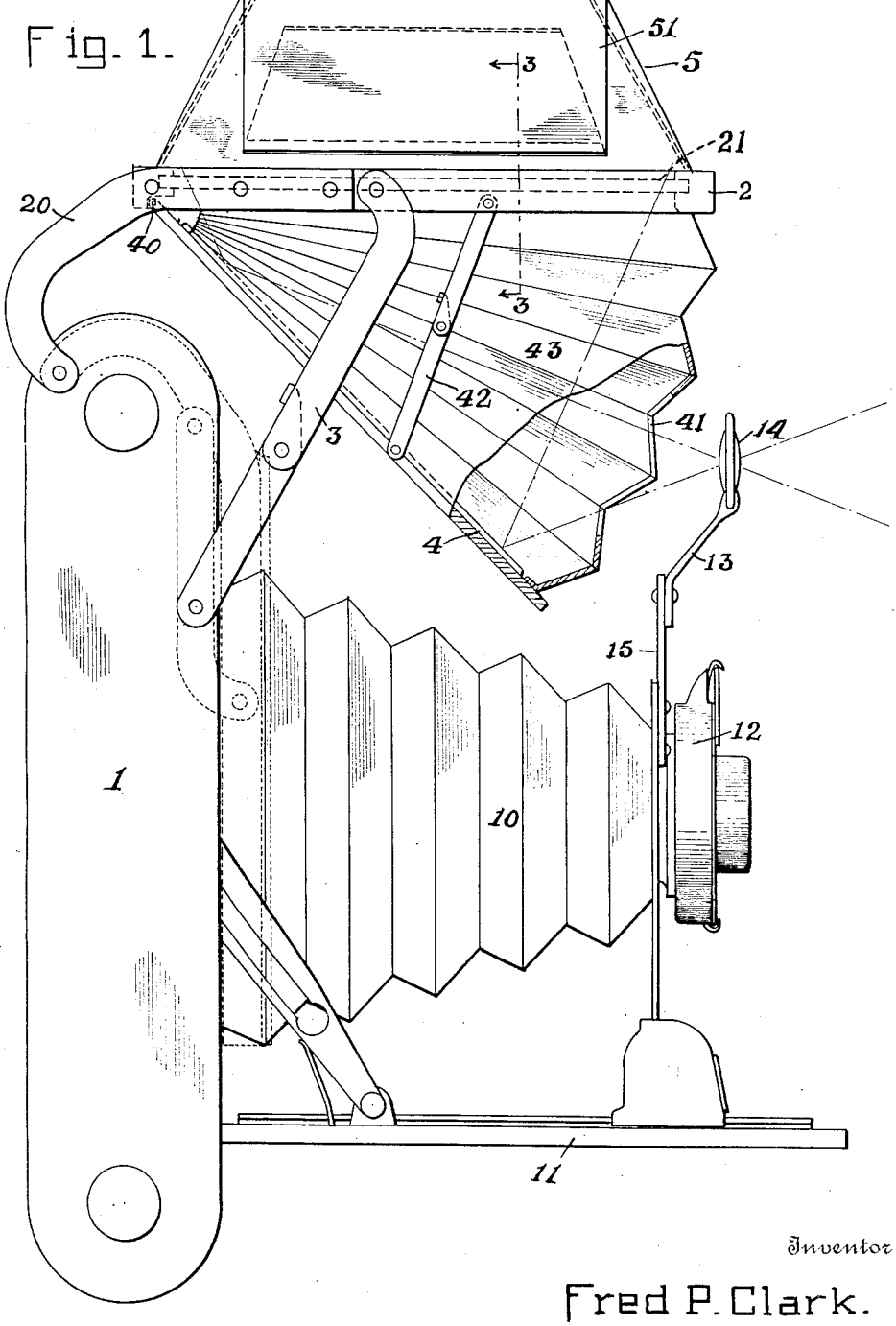
Figure 1 is a side elevation of a folding camera in its extended position, or the position occupied when taking a picture, showing also my attachment applied thereto and in the position occupied while being used.

In carrying out my invention I employ a finder lens which is mounted so as to move with the camera lens, which is employed in taking the picture, and which is of a focal length corresponding with that of the camera lens. In consequence, the finder lens may be used for focusing purposes.

In the drawings, 1 represents the casing of an ordinary typical camera of this character. As shown, the front, door section 11, is swung down into position for using the camera and the bellows 10 is extended. Mounted upon the frame 12 which carries the lens, is an arm 13, or any other suitable support, which carries the finder lens 14.

The arm 13 is herein shown as pivotally mounted upon an arm 15 which is fixed to the frame 12 so that the finder lens 14 may be swung downward, if this be necessary, in order to properly fold away the camera.

The attachment which is the subject of my invention, employs a frame 2, which is pivotally mounted upon the case so that it may be swung upward and outward into a position in which it is substantially parallel with the focal axis of the camera lens, and so that it may also be swung downward against the outer front face of the camera case when the camera is closed, which position is indicated by dotted lines in Fig. 1.

To properly position this frame when it is swung up into position of use, I have shown folding brace arms 3, consisting of two links, one pivoted upon the case, and the other upon the frame 2. As herein shown, the pivoting of this frame to the case is by two hook-shaped arms 20, which are spaced apart a distance to fit closely to the opposite outer surfaces of the camera case. The curving of these arms is desirable where it is necessary to provide the proper focal distance for the finder lens.

The frame 2 carries a translucent plate 21, which would ordinarily be of ground glass, upon which the picture is projected by the finder lens 14. Associated with the frame 2 is a mirror 4, this preferably being hinged, as at 40, toward the pivoted end of the frame 2, so that when this frame is swung upward into the position shown, the mirror 4 may swing down into a position which ordinarily would be at an angle of 45° with the plane of the ground glass 21.

A folding bellows hood 43 is used to connect the mirror 4 with the frame 2, this having two sides and an end and being provided in its outer end with an opening 41, which lies just behind the lens 14 and through which the rays of light, which form the picture, are projected. To properly position the mirror with relation to the frame when it is swung down, I have shown two pivoted links 42.

Figure 2:
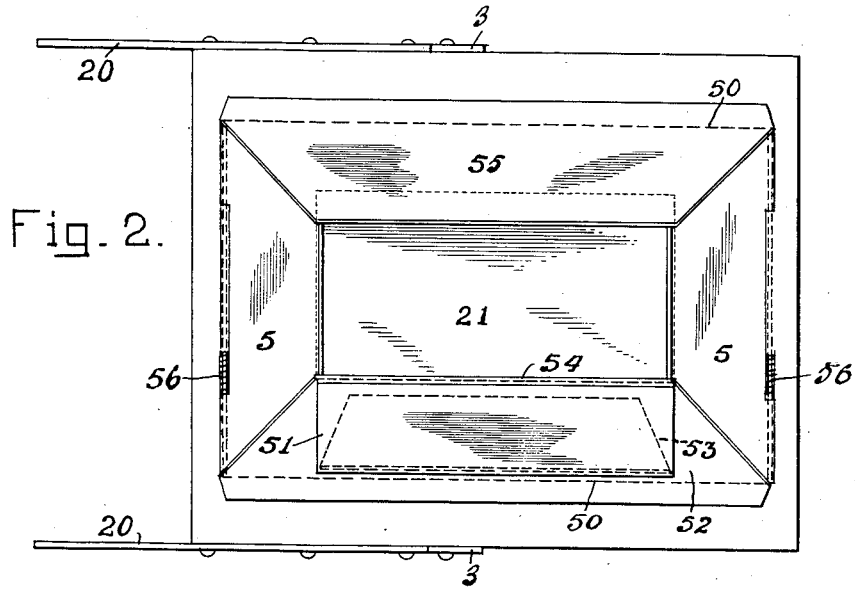
Fig. 2 is a face view of the attachment separate from the camera.

Preferably a hood or eye shield should be provided for the upper surface of the ground glass, in order to make the picture more readily visible. Such a hood is shown, this being shown by full lines in the position it would occupy when in use. It consists essentially of four plates 5, 5, 52, and 55 which when raised and properly positioned form the outlines of frustums of a pyramid. These are hinged along the edges which are next to the frame 2 as by the use of fabric strips 50, as shown in Fig. 3, or by pin hinges, as shown at 56 in Fig. 2.

At times it is desirable to take a picture with the long side of the camera case horizontal, in which case means should be provided so that the picture may be viewed from above, or from a direction at an angle of 90° with that contemplated when the longer direction of the camera is vertical. To secure this result, one of the sides, as the side 52, of the eye shield, is provided with an opening, as 53, and this is normally covered by a plate 51, which is hinged at its upper edge, as 54, so that it may be swung into position, either to close the opening 53, or the opening which is formed between the four sides of the shield.

Figure 3:
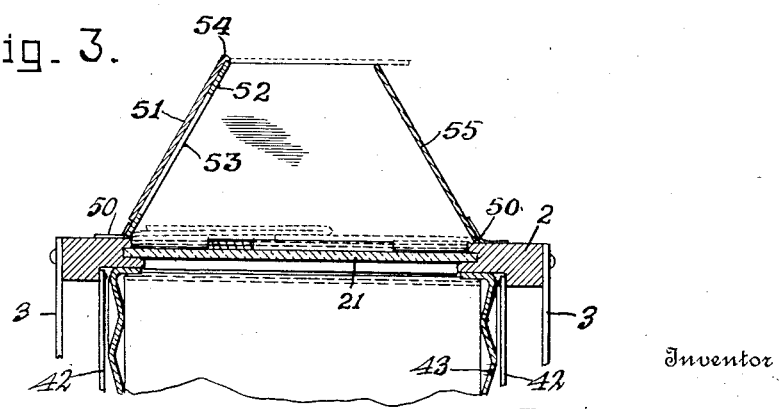
Fig. 3 is a cross section through the attachment on the plane of the line 3—3 of Fig. 1.

In Fig. 3 this plate 51 is shown as covering the opening 53, but by dotted lines its position when used to cover the other opening, is shown. To permit use of the camera in this position, the shield 55 should have an inner reflecting surface, that is be a mirror. When this is done the image which is projected upon the vertically placed ground glass plate 21, may be viewed from a position at right angles, through its reflection in the mirror 55. By this expedient the device may be used in either of the usual positions for taking pictures.

With the finder lens 14 properly placed and having the correct focal distance, and the ground glass plate 21 being properly positioned with relation to this focal distance, the camera may be very accurately focused.

When not in use the supporting links 3 and 42 are folded and then the frame 2 is swung down against the outer front face of the camera frame, as has been indicated by dotted lines in Fig. 1.

What I claim as my invention is:

1. A finder for folding cameras comprising a frame hinged exteriorly of the camera frame and adapted to swing into a position substantially paralleling the focal axis of the camera lens, a reflecting plate hinged to swing into an angular position at the inner side of said frame, a ground glass fixed in said frame and a focusing lens mounted to move with the camera lens and placed in front of said mirror.

2. A finder for folding cameras comprising a frame hinged at one end of the camera frame and adapted to swing down against the front side of the camera when it is in folded position, said frame having a ground glass and a mirror hinged toward the hinged end of the frame to swing inward when the frame is swung outward, and a focusing camera carried conjointly with the camera lens and movable in front of said mirror.

3. A device as in claim 2 having a folding hood connecting the mirror and frame and provided with a view opening at its outer or swinging end.

4. A finder for folding cameras comprising a frame hinged at one end of the camera frame and adapted to swing down against the front side of the camera when it is in folded position, said frame having a ground glass and a mirror hinged toward the hinged end of the frame to swing inward when the frame is swung outward, a folding hood connecting the mirror and frame and provided with a view opening at its outer or swinging end, screening plates on the side of the frame opposite to that of the hood and adapted to fold down against the frame, and a focusing lens carried conjointly with the camera lens and movable in front of said mirror.

5. A device as in claim 2 having folding links connecting said frame and mirror to properly space them when in use.

6. A finder for folding cameras comprising a frame hinged externally to one end of the camera case and adapted to swing down to lie against the front face of the camera case when the latter is folded and to swing into parallelism with the focal axis of the camera, a ground glass in said frame, a mirror hinged to the inner side of said frame toward its hinged end, a folding bellows hood connecting said mirror and the frame and having a sight opening in its outer end, a focusing lens supported in common with the camera lens and adapted to be positioned before the sight opening in the hood, a mirror hinged at the outer side of said frame along one side thereof.

7. A focusing finder for cameras, comprising an image receiving translucent plate pivotally supported to assume a position parallel with the axis of the camera lens, a reflecting mirror and a finder lens separate from and supported to move with the camera lens and having the same focal length.

8. A focusing finder for folding cameras comprising a frame having an image receiving plate therein and pivoted exteriorly of the camera to swing against the front side of the camera case and upward to a position parallel with the focal axis of the camera lens, folding links connecting said frame with the camera case to accurately locate and support the frame in the latter position, a mirror pivoted to the frame, and adapted to assume an angular position between said frame and the camera, a hood connecting the said frame and mirror and having a sight opening at its outer or swinging end, and a focusing lens carried conjointly with the main lens and having a like focal length, said lens being positioned in front of said opening in the hood.

Signed at Seattle, Washington, this 28th day of May, 1918.

FRED P. CLARK.